United States Patent
Jackson (12)

(10) Patent No.: US 6,559,891 B1
(45) Date of Patent: May 6, 2003

(54) METHOD AND APPARATUS TO GENERATE TRI-LEVEL HDTV SYNCHRONIZATION PULSES

(75) Inventor: Gregor Said Jackson, Los Gatos, CA (US)

(73) Assignees: Sony Corporation, Tokyo (JP); Sony Electronics Inc., Park Ridge NJ ( * ) Notice: Subject to any disclaimer, the term of this patent is extended or adjusted under 35 U.S.C. 154(b) by 455 days.

(21) Appl. No.: 09/639,455

(22) Filed: Aug. 15, 2000

(51) Int. Cl.[7] .............................. H04N 5/06; H04N 9/45; H04N 9/455

(52) U.S. Cl. ..................... 348/521; 348/524; 348/530; 348/531

(58) Field of Search ............................... 348/521, 522, 348/523, 524, 529, 530, 531; H04N 5/06, 9/45, 9/455, 5/067, 5/05, 5/45

(56) References Cited

U.S. PATENT DOCUMENTS

| | | | |
|---|---|---|---|
| 4,864,400 A | * | 9/1989 | Kumada et al. ............. 348/523 |
| 5,012,340 A | * | 4/1991 | Kirschenstein .............. 348/524 |
| 5,027,058 A | * | 6/1991 | Kleck et al. ................ 348/184 |
| 5,387,944 A | * | 2/1995 | Furumiya ................... 348/521 |
| 5,486,868 A | | 1/1996 | Shyu et al. |
| 5,561,467 A | | 10/1996 | Takeuchi et al. |
| 5,659,368 A | | 8/1997 | Landis |
| 5,751,366 A | | 5/1998 | Hobbs |
| 5,877,816 A | * | 3/1999 | Kim .......................... 348/526 |
| 5,946,052 A | | 8/1999 | Ozkan et al. |
| 6,025,882 A | | 2/2000 | Geshwind |

* cited by examiner

*Primary Examiner*—John Miller
*Assistant Examiner*—Trang U. Tran
(74) *Attorney, Agent, or Firm*—Miller Patent Services; Jerry A. Miller

(57) ABSTRACT

An ITU-R BT.656 (or similar) digital video signal is converted to analog at which point a simple 7-state state machine in combination with a 6 bit binary counter generates tri-level synchronized video. The state machine receives vertical and horizontal synchronization signals as well as End-Active-Video and Start-Active-Video signals from the ITU-R BT.656 video. A pixel clock clocks the 6 bit binary counter. Active video is passed directly to the output. Horizontal and vertical sync signals are mirrored at the output with the state machine generating a positive tri-level signal immediately following the horizontal synchronization signal. The high level signal is generated for a period of 44 pixel counts as counted by the 6 bit counter.

25 Claims, 4 Drawing Sheets

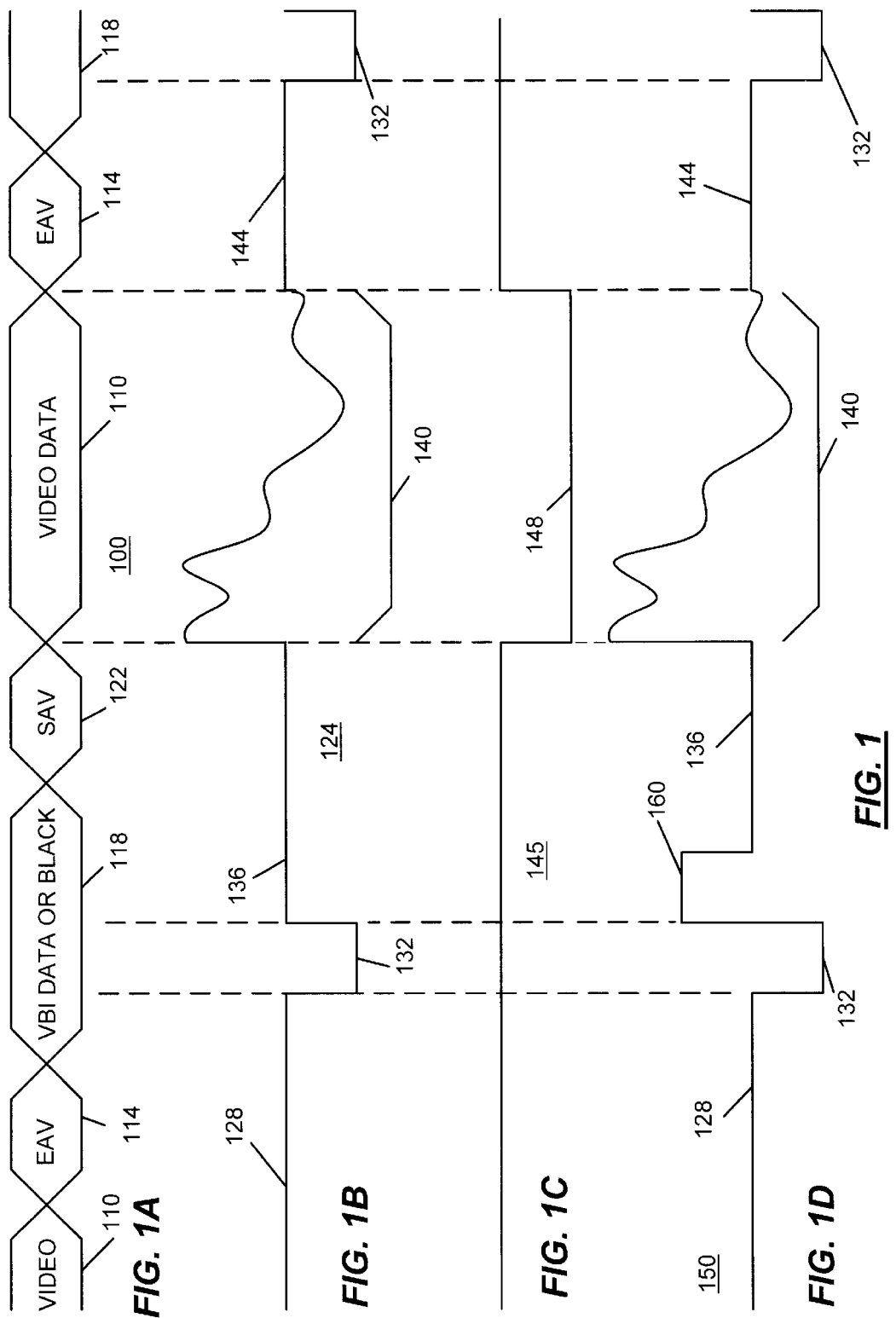

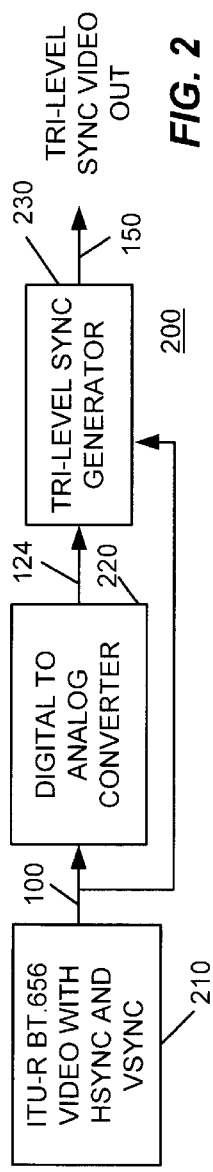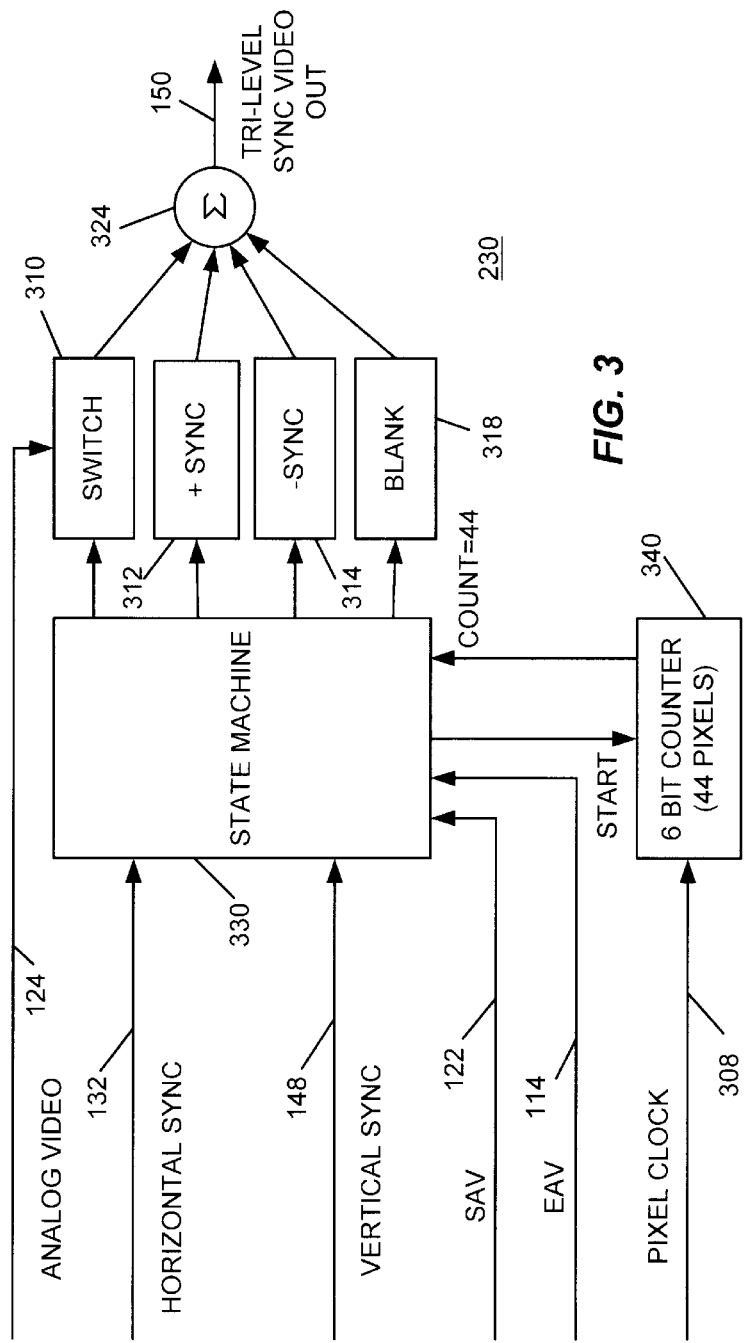

METHOD AND APPARATUS TO GENERATE TRI-LEVEL HDTV SYNCHRONIZATION PULSES

FIELD OF THE INVENTION

This invention relates generally to the field of High Definition Television (HDTV) synchronization as in the ATSC (Advanced Television Systems Committee) HDTV (High Definition Television) standard. More particularly, in certain embodiments, this invention relates to a method and apparatus to generate SMPTE 274-1995 tri-level pulses for HDTV from an ITU-R BT.656 or ITU-R BT0.601 or similar digital video stream.

BACKGROUND OF THE INVENTION

Reference is made herein to various HDTV standards including SMPTE 274-1995, which defines the specification for the timing and levels of the tri-level synchronization pulses discussed herein, and ITU-R BT.656(formerly CCIR-656), which specifies the digital video stream discussed herein. The ITU-R BT.601 specification describes a protocol that may include the Start Active Video and End Active Video signals and adds Horizontal and Vertical synchronization signals as discrete signals. The reader is directed to these publicly available documents for details of the specifications. These documents are hereby incorporated by reference herein. The present invention is applicable to other video protocols so long as the method or apparatus falls within the scope of the claims.

Digital video can be transmitted in various ways, often using the ITU-R BT.656 or ITU-R BT.601 protocol. These, and other, protocols can use digital signals to indicate the start and end of active video. It is generally the responsibility of the receiving system to generate synchronization pulses from these signals (note that provision is made for vertical and horizontal synchronization signals in the ITU-R BT.601 protocol). It is, therefore, advantageous to provide an inexpensive solution for production of these synchronization signals. In certain circumstances, it is desirable to be able to provide tri-level synchronization signals in accordance with SMPTE 274-1995 when presented with digital ITU-R BT0.656, or similar, protocol video signals.

SUMMARY OF THE INVENTION

The present invention relates generally to High Definition Television synchronization. Objects, advantages and features of the invention will become apparent to those skilled in the art upon consideration of the following detailed description of the invention.

In one exemplary embodiment consistent with the present invention, a method of generating tri-level video synchronization pulses, includes: detecting an End-Active-Video signal; responsive to detecting the End-Active-Video signal, generating a blanking signal output until a horizontal synchronization signal is received; upon receipt of the horizontal synchronization signal, generating a tri-level low signal output until the end of the horizontal synchronization signal is detected; upon detecting the end of the horizontal synchronization signal, generating a tri-level high signal output and starting a pixel counter; upon counting a predetermined number of pixel times, generating a blanking signal; detecting a start-of-video signal; upon detecting the Start-Active-Video signal, inspecting for a video synchronization signal; and if the inspecting determines a lack of a vertical synchronization signal, passing an analog video output until detection of a next End-Active-Video signal.

In another exemplary embodiment consistent with the present invention, an apparatus that generates tri-level synchronized video as an output on receipt of a digital video stream input includes a digital to analog converter that converts the digital video stream to a standard analog video signal having an active video portion, a vertical synchronization pulse and a horizontal synchronization pulse. A pixel counter is provided. A circuit coupled to the digital to analog converter generates the output signal by providing active video as the output during periods of active video in the standard analog video signal. The circuit also produces a negative synchronization signal level as the output during a duration of receipt of the horizontal synchronization pulse. The circuit is also coupled to the pixel counter and starts the pixel counter and generates a positive synchronization signal level as the output for a predetermined period as counted by the pixel counter immediately following the horizontal synchronization pulse. The circuit further produces a negative synchronization signal level as the output during a duration of receipt of the vertical synchronization pulse. The circuit also produces a blanking level as the output at other times.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1, made up of FIGS. 1A, 1B, 1C and 1D, is a diagram illustrating the relationship between ITU-R BT.656 digital video (FIG. 1A), analog HDTV video with standard synchronization pulses (FIG. 1B), Vertical synchronization signal (FIG. 1C) and analog HDTV video with SMPTE 274M-1995 tri-level synchronization pulses (FIG. 1D).

FIG. 2 is a high level system representation of a conversion from ITU-R BT.656 digital video to SMPTE 274M-1995 tri-level synchronized video.

FIG. 3 is a block diagram of an embodiment of the tri-level sync generator 230 of FIG. 2 consistent with the present invention.

DETAILED DESCRIPTION OF THE INVENTION

Figure 4:
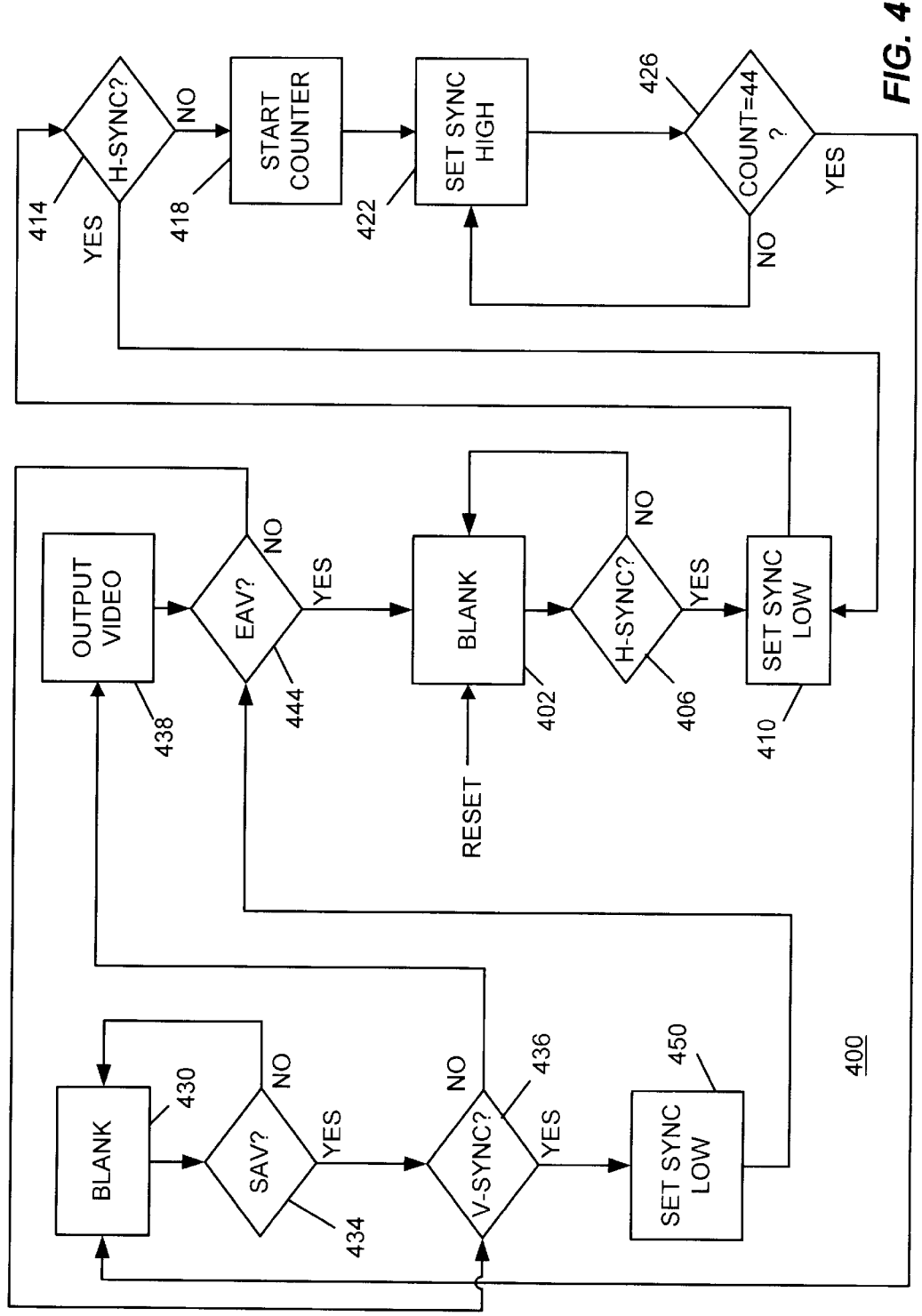
FIG. 4 is a state diagram/flow chart of the operation of the tri-level sync generator 230 of FIGS. 2 and 3.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, and with specific reference to FIG. 1A, an ITU-R BT.656 digital video stream is shown. An active video portion 110 is followed by an End-Active-Video (EAV) signal 114. Following the End-Active-Video portion 114, vertical blanking interval data or black is transmitted at 118. A Start-Active-Video (SAV) portion 122 defines the beginning of a segment of video data 110 until the End-Active-Video signal 114 is again transmitted.

Referring now specifically to FIG. 1B in combination with FIG. 1A, the curve 124 includes a blanking signal level 128 until such time as a Horizontal synchronization pulse 132 which is again followed by a blanking period 136. The active analog video portion appears at 140 followed again by blanking 144 until the next Horizontal synchronization pulse 132.

FIG. 1C illustrates a Vertical synchronization pulse such as might be supplied from an ITU-R BT.601 compliant digital video circuit. Curve 145 illustrates a Vertical synchronization pulse 148 presented during the time when the digital video data 110 would normally be present in the digital video stream. This Vertical synchronization pulse 148 is utilized in the circuit of FIG. 3 and the state diagram of FIG. 4.

With reference to FIG. 1D taken in combination with FIGS. 1A and 1B, the relationship of a SMPTE 274M-1995 tri-level synchronized video signal 150 is illustrated. This signal 150 is similar in timing to signal 124 except for the addition of tri-level high pulse 160 following the horizontal synchronization pulse 132 (which is at a tri-level low state). This tri-level signal provides for transmission of full brightness as well as full darkness for use as a reference level for display. Thus, for receivers receiving signal 150, a user brightness adjustment is not necessary.

Referring now to FIG. 2, a system 200 for generating tri-level sync video signals such as signal 150 is illustrated with a source of ITU-R BT.656 video 210 supplying signal 100 to a digital-to-analog converter 220. Digital-to-analog converter 220 produces signal 124 which is received by a tri-level sync generator 230 along with signal 100 to produce signal 150 as tri-level synchronized video out. Signal 100 is shown coupled to the tri-level sync generator 230 to indicate that certain signals from the digital video stream (or signals representing such signals) are also provided directly to the tri-level synchronization generator 230.

Most modern HDTV chips output data in ITU-R BT.656 format at various resolutions and pixel clock frequencies as described in various standards (e.g. NTSC). Any vertical and horizontal resolution signal, in general, can be generated in an ITU-R BT.656 format digital signal. Such circuits typically also output ITU-R BT.601 type Horizontal Sync and Vertical Sync signals as discrete output signals. As shown, signal 100 can be assumed to include both the digital video signal and discrete Horizontal and Vertical synchronization signals and a pixel clock as will become apparent on consideration of the next figure.

With reference to FIG. 3, analog video signal 124 from the digital to analog converter 220 is received as an input to 230. In addition, tri-level synchronization generator 230 receives signals representing the presence of Horizontal synchronization signals 132 as in FIG. 1B, and Vertical synchronization signals, such as Vertical synchronization pulse 148 of FIG. 1C (e.g. ITU-R BT.601 Horizontal and Vertical sync signals). These signals can be derived directly from the analog video signal 124 at circuit 230, or can be supplied from the digital video stream 100 or from separate synchronization detection circuitry in accordance with the embodiment at hand. As previously mentioned, many modern digital video chips typically output ITU-R BT.601 type Horizontal Sync and Vertical Sync signals as discrete output signals. Such chips are readily commercially available.

The End-Active-Video signal 114 and Start-Active-Video signal 122 are readily available from the digital video stream 100. A pixel clock 308 is readily extracted from the digital video stream 100 or provided by associated circuitry. Those skilled in the art will understand that the ITU-R BT.656 video signal is a parallel signal wherein the End-Active-Video and Start-Active-Video signals are all zeros or all ones. The Horizontal synchronization signal 132, Vertical synchronization signal 148 and pixel clock signal 308 are readily extracted from the ITU-R BT.656 video signal 100 using known circuitry, as previously discussed.

The final tri-level synchronized video output signal 150 can be created by switching the analog video signal 124 with a switch 310 to provide the active video segment 140. Also, a positive sync generator 312, a negative sync generator 314 and a blanking level generator 318 can be appropriately added to the switched active-video-signal 140 from switch 310 in an adder 324 to produce the tri-level synchronized video output signal 150. The heart of the tri-level synchronization generator 230 is a 7-state state machine 330 operating in conjunction with a 6 bit counter 340. The use of the small state machine 330 in conjunction with a single 6 bit counter 340 results in an implementation of the tri-level sync generator which is very small, inexpensive and easily realized.

State machine 330 receives Horizontal synchronization signal 132, Vertical synchronization signal 148, Start-Active-Video signal 122 and End-Active-Video signal 114 as inputs. The duration of the high synchronization pulse 160 of FIG. 1C equates to 44 pixels for 1080 line interlaced SMPTE-274 video. Thus, the time for pulse 160 is established by the 6 bit counter 340 which turns on at the end of the horizontal synchronization pulse and begins counting pixels from pixel clock 308 until 44 pixel counts are received, for this particular video resolution. When 44 pixel counts are received the high synchronization pulse ends. Thus, the state machine switches analog video signal 124 through switch 310 to the output during the period of time between receipt of a Start-Active-Video signal and an End-Active-Video signal. During the times when a negative Horizontal sync signal is being received, the state machine produces a negative sync signal at 314 as a contribution to the output signal. At the end of the Horizontal sync signal at 314 a positive sync signal is generated at 312 for a duration of 44 pixel counts. During all other times, a blanking signal level is generated at 318 to assemble the output.

Used in conjunction with a digital video chip that outputs ITU-R BT.656 digital video along with ITU-R BT.601 Horizontal and Vertical synchronization signals, an embodiment of the present invention can be implemented using only a simple state machine, a six bit counter and an eight or ten bit (depending on the width of the digital video stream) AND or NOR gate to detect the presence of SAV and EAV (as will be illustrated later). Since SAV always follows a Horizontal sync pulse and SAV is always followed by EAV, synchronization is guaranteed.

Since SAV always follows a Horizontal sync pulse and SAV is always followed by EAV, there is actually no need to distinguish between the SAV and EAV signals in the state machine 330. The SAV and EAV signals are described in ITU-R BT.656 as a series of "pixels" comprising all zeros and ones. This series of all ones or all zeros represent a preamble to the actual SAV or EAV information word. The standard prohibits a word of all ones or zeros occurring in the actual video data in order to assure recognition of SAV and EAV sequences. Thus, video chips generally clip the actual pixel information to represent a pure black or white signal. This will be illustrated in greater detail later.

It is also important to note that the 44 pixel clock holds for SMPTE-274 video at 1080 lines interlaced resolution. But, other Horizontal synchronization lengths can be accommodated by change in the pixel clock count. Moreover, the clock can be made to count, for example, 43 or 45 pixel counts with minor modifications to account for this different count, without departing from the present invention.

Referring now to FIG. 4, a state diagram/flow chart 400 illustrates the seven states and decisions that govern the operation of state machine 330. In one embodiment, a reset can be entered at state 402 which generates a blanking signal level until a Horizontal synchronization pulse is detected at 406. In other embodiments, a reset can be entered at other locations of the state diagram of FIG. 4. When a Horizontal synchronization pulse is detected at 406, the state machine 330 sets a low sync pulse or negative sync pulse at 410 which persists as long as a Horizontal synchronization pulse 132 persists as detected by 414. When the end of the Horizontal sync is detected at 414, the 6 bit pixel counter 340 is started at 418. At this point, a positive Horizontal synchronization signal (high synchronization) is set at 422 until such time as counter 340 has counted 44 pixels at 426. At this point, a blanking signal is generated at 430 until such time as the Start-Active-Video signal 122 is detected at 434.

If no Vertical synchronization signal 148 is present after the Start-Active-Video signal 122 is detected at 434, active video signal 140 is output at 438 until such time as an End-Active-Video signal 114 is received at 444. When the End-Active-Video signal is received at 444, control passes back to 402 to repeat the process. If a Vertical synchronization signal 148 is detected at 436 after the Start-Active-Video signal 122 has been detected at 434, a negative synchronization signal is set at 450 until the End-Active-Video signal 114 is received at 444. If no EAV signal is received at 444, control passes to 436 to check for presence of a Vertical synchronization signal. If Vertical synchronization is not present, video is output at 438 until EAV is detected at 444.

Thus, the seven-state state machine 330 (having states 402, 410, 418, 422, 423, 430 and 450) can be economically implemented to produce tri-level synchronization signals for tri-level synchronized video output from an ITU-R BT.656 or ITU-R BT.601 (or similarly formatted) digital video stream in accordance with the present invention. While the present invention has been specifically described in conjunction with the ITU-R BT.656 or ITU-R BT.601 digital video streams, it should not be so limited. The present invention can be practiced with any digital video stream that uses signals similar to SAV or EAV, and such digital video streams are equivalent. Moreover, the embodiment described counts 44 pixels in accordance with the SMPTE-274 standard at 1080 lines interlaced, but the invention can be modified simply to count to 43 or 45 with minor modification. Moreover, for other video resolutions, the number counted could be modified accordingly without departing from the invention.

Figure 5:
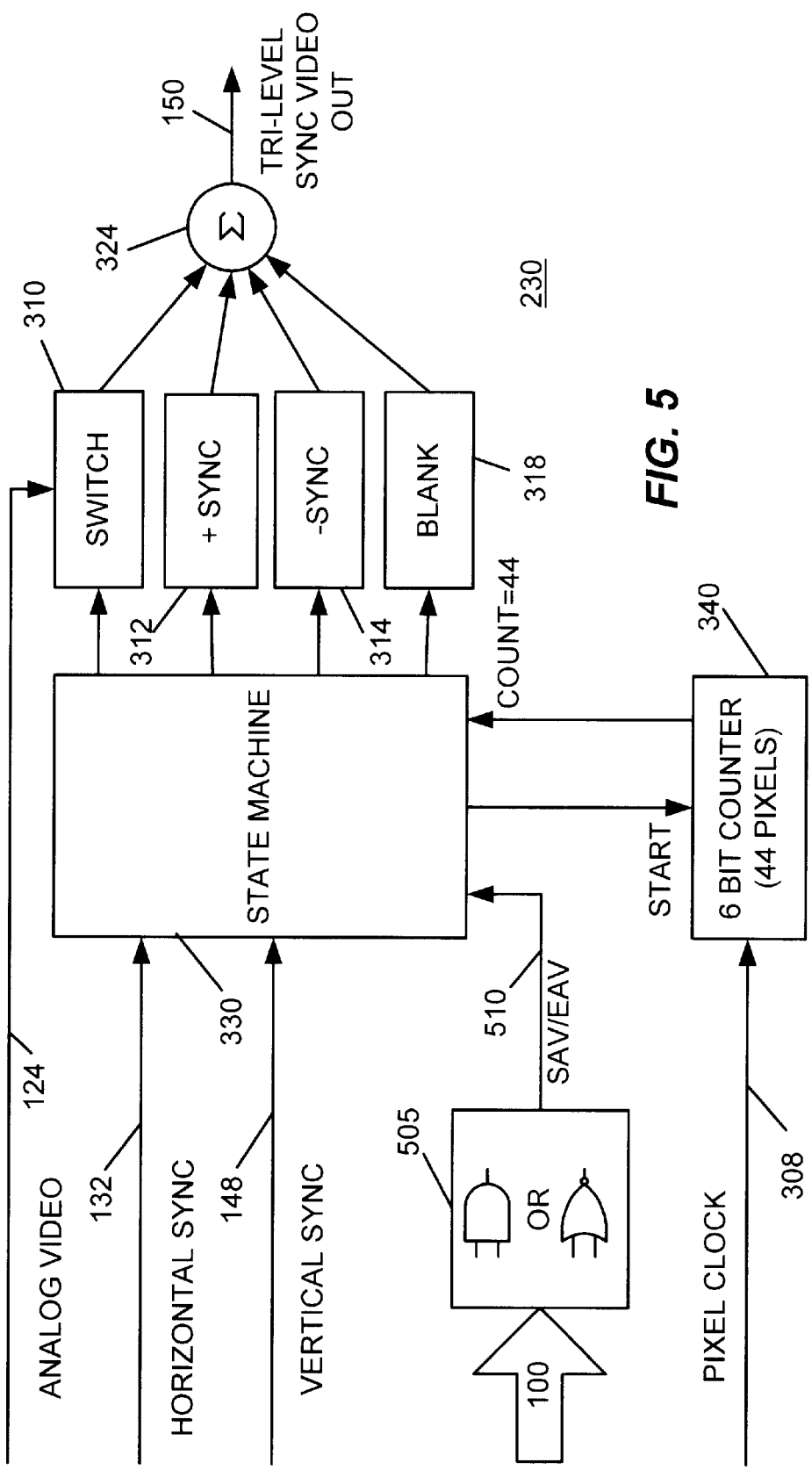
FIG. 5 is a block diagram of another embodiment of the tri-level sync generator 230 of FIG. 2 consistent with the present invention, using a logic NOR or AND function to detect SAV and EAV.

Referring now to FIG. 5, an alternative embodiment using a logic NOR or AND function to detect SAV and EAV is illustrated. In this embodiment, the ITU-R BT.656 or ITU-R BT.601 digital video stream 100, which is a parallel eight or ten bit signal, is applied to a logic function 505. Since EAV and SAV are either all zeros or all ones in the parallel video stream, a logical AND or NOR function can be used to detect presence of the signals. Since SAV always follows a Horizontal sync pulse and SAV is always followed by EAV, there is actually no need to distinguish between the SAV and EAV signals in the state machine 330. There is no need for any sort of complex decoding circuitry to decode EAV and SAV due to the inherent synchronization of the state machine 330. A simple logic function will suffice leading to an inexpensive implementation.

Those skilled in the art will recognize that the present invention has been described in terms of exemplary embodiments based upon use of a seven state logic machine and a six bit counter. However, the invention should not be so limited, since the present invention could be implemented using other hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of generating tri-level video synchronization pulses, comprising:
   detecting an End-Active-Video signal;
   responsive to detecting the End-Active-Video signal, generating a blanking signal output until a horizontal synchronization signal is received;
   upon receipt of the horizontal synchronization signal, generating a tri-level low signal output until the end of the horizontal synchronization signal is detected;
   upon detecting the end of the horizontal synchronization signal, generating a tri-level high signal output and starting a pixel counter;
   upon counting a predetermined number of pixel times, generating a blanking signal;
   detecting a start-of-video signal;
   upon detecting the Start-Active-Video signal, inspecting for a video synchronization signal; and
   if the inspecting determines a lack of a vertical synchronization signal, passing an analog video output until detection of a next End-Active-Video signal.

2. The method of claim 1, further comprising:
   if the inspecting determines a presence of a vertical synchronization signal, generating a tri-level low signal output until detection of a next End-Active-Video signal.

3. The method of claim 1, wherein the pixel counter comprises a six bit binary counter.

4. The method of claim 1, wherein the pixel counter counts transitions of a pixel clock.

5. The method of claim 4, wherein the pixel clock is derived from an ITU-R BT.656 digital video source.

6. The method of claim 1, wherein the Start-Active-Video signal is detected from an ITU-R BT.656 digital video source.

7. The method of claim 1, wherein the End-Active-Video signal is detected from an ITU-R BT.656 digital video source.

8. The method of claim 1, wherein the predetermined number of pixel times comprises 44 pixel times.

9. The method of claim 1, wherein the Start-Active-Video signal is detected by applying a logic function, comprising one of a NOR and an AND function, to a parallel digital video stream.

10. The method of claim 1, wherein the End-Active-Video signal is detected by applying a logic function, comprising one of a NOR and an AND function, to a parallel digital video stream.

11. The method of claim 1, wherein detecting the End-Active-Video signal and detecting the Start-Active-Video signal are carried out by by applying a logic function, comprising one of a NOR and an AND function, to a parallel digital video stream.

12. An apparatus that generates tri-level synchronized video as an output on receipt of a digital video stream input, comprising:
   a digital to analog converter that converts the digital video stream to a standard analog video signal having an active video portion, a vertical synchronization pulse and a horizontal synchronization pulse;
   a pixel counter;
   a circuit coupled to the digital to analog converter that generates the output signal by providing active video as the output during periods of active video in the standard analog video signal;
   the circuit further producing a negative synchronization signal level as the output during a duration of receipt of the horizontal synchronization pulse;
   the circuit being coupled to the pixel counter and further starting the pixel counter and generating a positive synchronization signal level as the output for a predetermined period as counted by the pixel counter immediately following the horizontal synchronization pulse;
   the circuit further producing a negative synchronization signal level as the output during a duration of receipt of the vertical synchronization pulse; and
   the circuit producing a blanking level as the output at other times.

13. The apparatus of claim 12, wherein during the presence of the vertical synchronization signal, a tri-level low signal output is produced until detection of an End-Active-Video signal in an End-Active-Video detection circuit.

14. The apparatus of claim 13, wherein the End-Active-Video circuit comprises a logic gate, carrying out one of a logic NOR and a logic AND function, coupled to the digital video stream to produce an indication at an output thereof of the presence of an End-Active-Video signal.

15. The apparatus of claim 12, wherein the pixel counter comprises a six bit binary counter.

16. The apparatus of claim 12, wherein the pixel counter counts transitions of a pixel clock.

17. The apparatus of claim 16, wherein the pixel clock is derived from an ITU-R BT.656 digital video source.

18. The apparatus of claim 12, wherein a start of presence of active video is determined by receipt of a Start-Active-Video signal as determined by a Start-Active-Video detector circuit.

19. The apparatus of claim 13, wherein the Start-Active-Video circuit comprises a logic gate, carrying out one of a logic NOR and a logic AND function, coupled to the digital video stream to produce an indication at an output thereof of the presence of an Start-Active-Video signal.

20. The apparatus of claim 18, wherein the Start-Active-Video signal is detected from an ITU-R BT.656 digital video source.

21. The apparatus of claim 12, an end of presence of active video is determined by receipt of an End-Active-Video signal detected from an ITU-R B.656 digital video source.

22. The apparatus of claim 21, wherein the End-Active-Video signal is detected from an ITU-R BT.656 digital video source.

23. The apparatus of claim 12, wherein the predetermined period comprises 44 pixels.

24. The apparatus of claim 12, wherein the circuit comprises a seven state logic machine.

25. An apparatus that generates SMPTE 274M-1995 tri-level synchronized video as an output on receipt of an ITU-R BT.656 digital video stream input, comprising:
   a digital to analog converter that converts the ITU-R BT.656 digital video stream to a standard analog video signal having an active video portion, a vertical synchronization pulse and a horizontal synchronization pulse;
   a pixel counter comprising a binary six bit counter that counts 44 pixels from a pixel clock, the pixel clock being derived from the ITU-R BT.656 digital video stream input;
   a circuit, coupled to the digital to analog converter and the pixel counter, comprising a seven state logic machine that generates the output signal by providing active video as the output during periods of active video in the standard analog video signal, the beginning of periods of active video being determined by receipt of a Start-Active-Video signal, and the end of periods of active video being determined by receipt of an End-Active-Video signal, the Start-Active-Video and End-Active-Video signals being received from the ITU-R BT.626 digital video stream input;
   the circuit further producing a negative synchronization signal level as the output during a duration of receipt of the horizontal synchronization pulse;
   the circuit further starting the pixel counter and generating a positive synchronization signal level as the output for a predetermined period as counted by the pixel counter immediately following the horizontal synchronization pulse;
   the circuit further producing a tri-level low synchronization signal level as the output during a duration of receipt of the vertical synchronization pulse until detection of an End-Active-Video signal;
   the circuit producing a blanking level as the output at other times;
   wherein, the Start-Active-Video signal and the End-Active-Video signal are detected by applying a logic function, comprising one of a NOR and an AND function, to the ITU-R BT.626 digital video stream; and
   whereby, the output comprises an SMPTE 274M-1995 tri-level synchronized video signal.

* * * * *

UNITED STATES PATENT AND TRADEMARK OFFICE
CERTIFICATE OF CORRECTION

PATENT NO.   : 6,559,891 B1
DATED        : May 6, 2003
INVENTOR(S)  : Jackson

It is certified that error appears in the above-identified patent and that said Letters Patent is hereby corrected as shown below:

Column 1,
Line 14, replace "ITU-R BT0.601" with -- ITU-R BT.601 --.
Lines 44-45, replace "ITU-R BT0.656" with -- ITU-R BT.656 --.
Line 65, replace "start-of-video" with -- Start-Active-Video --.

Column 5,
Line 49, replace "423" with -- 438 --.

Column 6,
Line 51, replace "start-of-video" with -- Start-Active-Video --.

Column 7,
Line 19, replace "of of" with -- of --.

Column 8,
Line 9, insert -- wherein -- after the comma.

Signed and Sealed this

Twenty-sixth Day of August, 2003

JAMES E. ROGAN
*Director of the United States Patent and Trademark Office*